US008709519B1

(12) United States Patent
dePoo

(10) Patent No.: US 8,709,519 B1
(45) Date of Patent: Apr. 29, 2014

(54) METHOD AND APPARATUS FOR ACCESSING COCONUT WATER

(76) Inventor: Paul dePoo, Key West, FL (US)

( * ) Notice: Subject to any disclaimer, the term of this patent is extended or adjusted under 35 U.S.C. 154(b) by 0 days.

(21) Appl. No.: 12/793,097

(22) Filed: Jun. 3, 2010

(51) Int. Cl.
| | | |
|---|---|---|
| *A23N 5/03* | (2006.01) | |
| *A23L 2/04* | (2006.01) | |
| *A23N 5/08* | (2006.01) | |

(52) U.S. Cl.
CPC ... *A23N 5/03* (2013.01); *A23L 2/04* (2013.01); *A23N 5/08* (2013.01)
USPC .......................................................... 426/489

(58) Field of Classification Search
CPC ............... A23L 2/04; A23L 2/06; A23L 2/08; A23N 1/00; A23N 1/003; A23N 5/00; A23N 5/03; A23N 5/08
USPC ........................................................ 426/489
See application file for complete search history.

(56) References Cited

U.S. PATENT DOCUMENTS

| | | | |
|---|---|---|---|
| 1,277,308 A | | 8/1918 | Gunturiz |
| 1,506,571 A | * | 8/1924 | Deremberg ..................... 99/495 |
| 1,630,420 A | | 5/1927 | Garland |
| 2,062,853 A | | 12/1936 | Wright |
| 2,472,354 A | | 6/1949 | Waters |
| 4,010,543 A | | 3/1977 | Nusbaum |
| 4,602,725 A | | 7/1986 | Malpas et al. |
| 5,005,336 A | | 4/1991 | Bloom |
| 5,016,389 A | | 5/1991 | Odom |
| 5,044,512 A | * | 9/1991 | Giancaspro et al. .......... 220/709 |
| 5,119,559 A | | 6/1992 | Sanabria |
| 5,509,551 A | * | 4/1996 | Terrell, II ....................... 215/229 |
| 2004/0071846 A1 | | 4/2004 | de la Mora et al. |
| 2004/0182871 A1 | | 9/2004 | Whyte |
| 2004/0256015 A1 | * | 12/2004 | Margetson ..................... 138/109 |
| 2009/0291172 A1 | * | 11/2009 | Saez ............................ 426/330.5 |
| 2010/0124595 A1 | | 5/2010 | Pattenden |

FOREIGN PATENT DOCUMENTS

| | | | | |
|---|---|---|---|---|
| AU | 2004101090 | * | 2/2005 | .............. A47J 25/00 |
| CN | 101486962 | | 7/2009 | |
| DE | 19853804 | | 5/2000 | |
| DE | 102006041597 | | 3/2008 | |
| GB | 2.323.549 | | 9/1998 | |

OTHER PUBLICATIONS

International Search Report dated Jan. 5, 2012, in PCT Application No. PCT/US2011/047147, 4 pages.
Written Opinion of the International Searching Authority dated Jan. 5, 2012, in PCT Application No. PCT/US2011/047147, 5 pages.

* cited by examiner

*Primary Examiner* — Chhaya Sayala
*Assistant Examiner* — Jerry W Anderson
(74) *Attorney, Agent, or Firm* — DLA Piper LLP (US)

(57) ABSTRACT

A spigot for a coconut that provides easy access by consumers to the sterile coconut water within a coconut. The spigot is comprised of a conduit having a spike-tip on one end and a spout on the other with a through bore therebetween. The coconut having a partially inserted spigot is provided to the consumer whereby the consumer gains access to the sterile coconut water by pushing the partially inserted spigot to its seated position with a grommet provided as an insertion stop for the spigot. An optional air vent is provided to aid in fluid flow from the spigot.

1 Claim, 24 Drawing Sheets

METHOD AND APPARATUS FOR ACCESSING COCONUT WATER

BACKGROUND OF THE INVENTION

1. Field of the Invention

The present invention relates generally to spigots and, more specifically, to a spigot for a coconut that provides easy access by consumers to the sterile coconut water within a coconut. The spigot is comprised of a conduit having a spike-tip on one end and a spout on the other with a through bore therebetween. A retaining ring is also provided as a stop for the spigot. A spigot cap is placed over the spigot and covered with a protective member.

The coconut having a spigot is provided to the consumer whereby the consumer gains access to the sterile coconut water by pushing the partially inserted spigot to its seated position.

Initially the spigot is inserted through the husk and into the coconut meat having a length of un-inserted conduit extending from the exterior. The spigot remains within the coconut meat until time of use maintaining the sterile condition of the coconut water until selective consumption by the consumer.

The present invention further provides for an optional air vent and straw that optionally provides for a filter to prevent pulp from being drawn into the straw.

Further provided are the additional elements of a coconut stand and handle mountable to the coconut and a spigot having a plunger movable from a fluid blocking position within the spigot to an unblocking position so that the coconut water can be poured into a glass.

2. Description of the Prior Art

There are other spigot devices designed for containers. While these spigots may be suitable for the purposes for which they where designed, they would not be as suitable for the purposes of the present invention as heretofore described.

It is thus desirable to provide a spigot for a coconut that will allow a consumer to easily extract the sterile coconut water within a coconut It is further desirable to use the coconut husk as opposed to re-packaging the coconut water since the husk is biodegradable and the coconut water remains sterile while contained within the husk

SUMMARY OF THE PRESENT INVENTION

A primary object of the present invention is to provide spigot access to the coconut water within a coconut.

Another object of the present invention is to provide access to coconut water within a coconut by initially inserting the spigot through the husk and into the coconut meat without piercing the coconut water cavity.

Yet another object of the present invention is to provide a spigot having a cap that is placed over the partially inserted spigot to prevent casual displacement of the spigot during shipping and handling.

Still yet another object of the present invention is to provide a spigot a protective member serving as a tamper evident seal.

An additional object of the present invention is to provide easy access by consumers to the coconut water within a coconut without comprising its sterile contents.

A further object of the present invention is to provide a spigot that will provide access to the coconut water within a coconut by a consumer pressing the spigot through the remained of the coconut meat and into the coconut water cavity.

A yet further object of the present invention is to provide an optional air vent having a resealable aperture.

A still yet another object of the present invention is to provide a straw that may have a filter on one end to prevent pulp from being drawn in.

Another object of the present invention is to provide a stand for a coconut.

Yet another object of the present invention is to provide a handle attachable to a coconut.

Still yet another object of the present invention is to provide a spigot having a plunger that is movable from a blocking position to an unblocking position so that the coconut water can be poured into a glass.

Additional objects of the present invention will appear as the description proceeds.

The present invention overcomes the shortcomings of the prior art by providing a spigot for a coconut that allows easy access by consumers to the sterile coconut water within a coconut. The spigot is comprised of a conduit having a lance on one end and a flange on the other having a through bore therebetween. A retaining ring is provided as a stop for the spigot. A spigot cap is placed over the spigot and covered with a protective member. The coconut having a spigot is provided to the consumer whereby the consumer gains easy access to the sterile coconut water by pushing the partially inserted spigot to its seated position.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
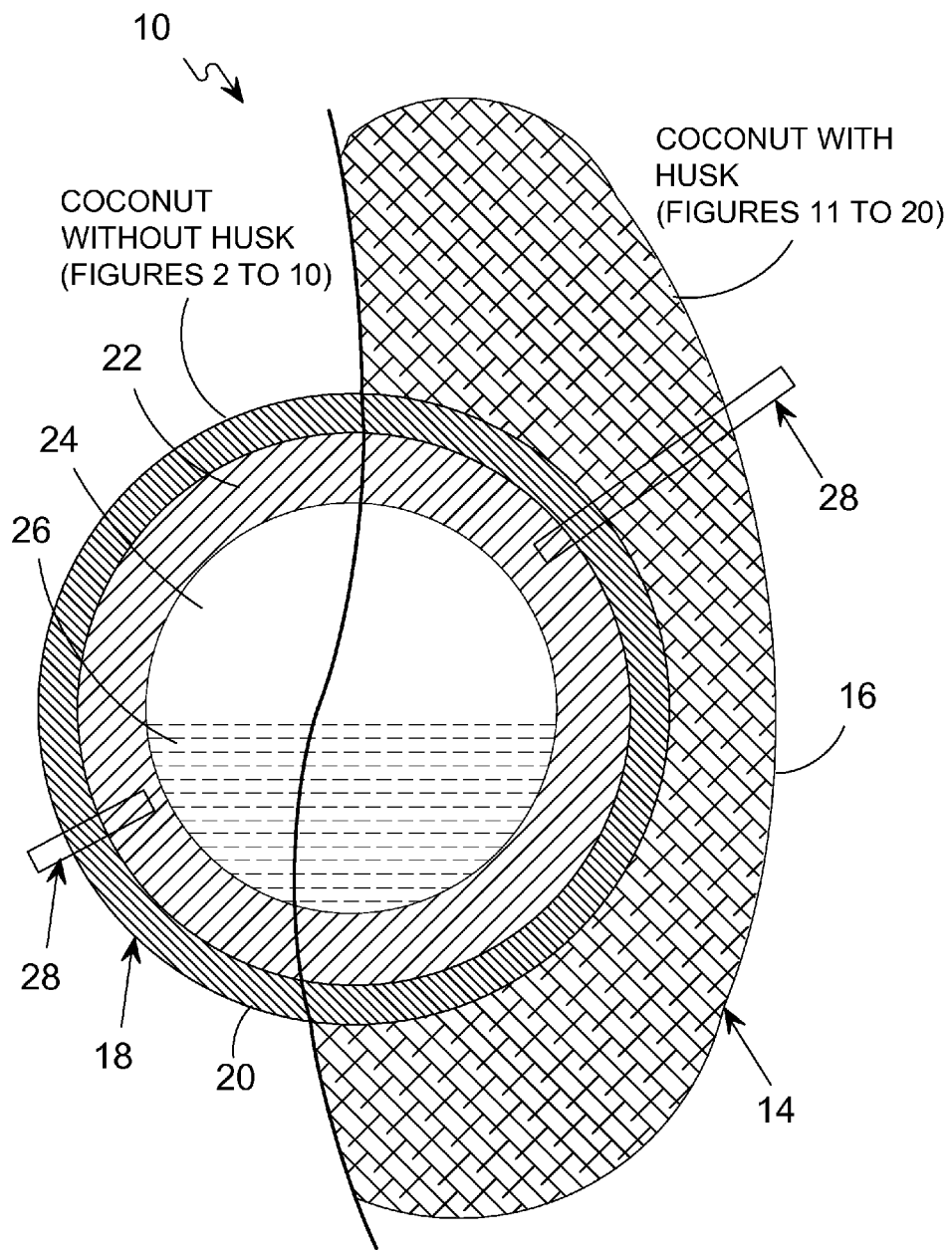
FIG. 1 is a sectional view of a coconut with and without the coconut husk providing means for accessing the coconut water when desired.

Turning now descriptively to the drawings, in which similar reference characters denote similar elements throughout the several views, the figures illustrate the Coconut with Spigot of the present invention. With regard to the reference numerals used, the following numbering is used throughout the various drawing figures.
10 Coconut With Spigot of the present invention
12 consumer
14 coconut
16 coconut husk
18 coconut seed
20 coconut seed-case
22 coconut meat
24 coconut seed-case cavity
26 coconut water
28 spigot
30 spout
32 conduit
34 spike-tip
36 grommet
38 spigot cap
40 cap flange
42 cap seal
44 air valve
46 tethered bung
48 straw
50 straw filter
52 stand
54 handle
56 plunger
58 glass

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a sectional view of a coconut with and without the coconut husk providing means for accessing the coconut water when desired. The present invention 10 provides a spigot 28 that is partially inserted into the coconut meat 22 and then shipped to consumers who then complete inserting the spigot 28 through the coconut meat 22 into the coconut cavity 24 providing access to the sterile coconut water 26. As illustrated, the present invention provides that the spigot 28 can be used with coconuts 14 having husk 16 or with the husk removed leaving the coconut seed having coconut seed-case 20.

Figure 2:
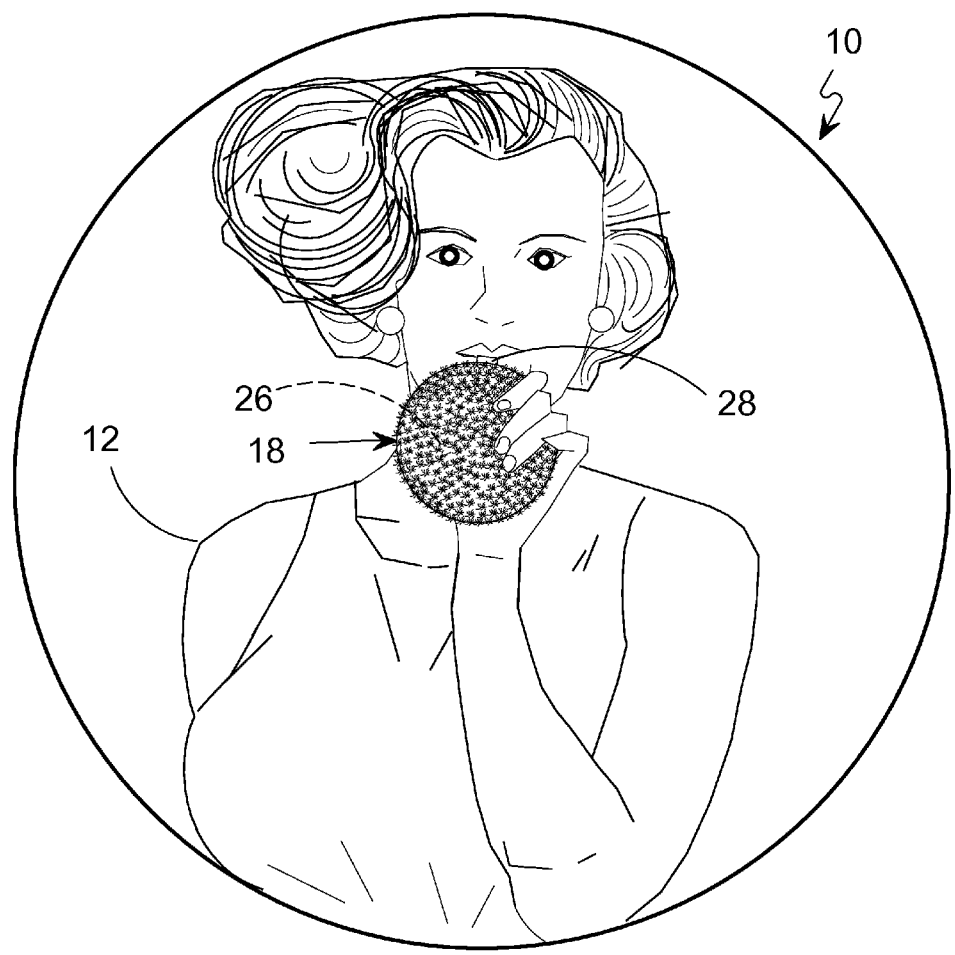
FIG. 2 is an illustrative view of the present invention in use.

FIG. 2 is an illustrative view of the present invention in use. The present invention 10 provides a spigot 28 that is partially imbedded into a coconut seed 18 so that a consumer 12 can gain access to the coconut water 26 by completing the insertion of the spigot 28 through the coconut meat.

Figure 3:
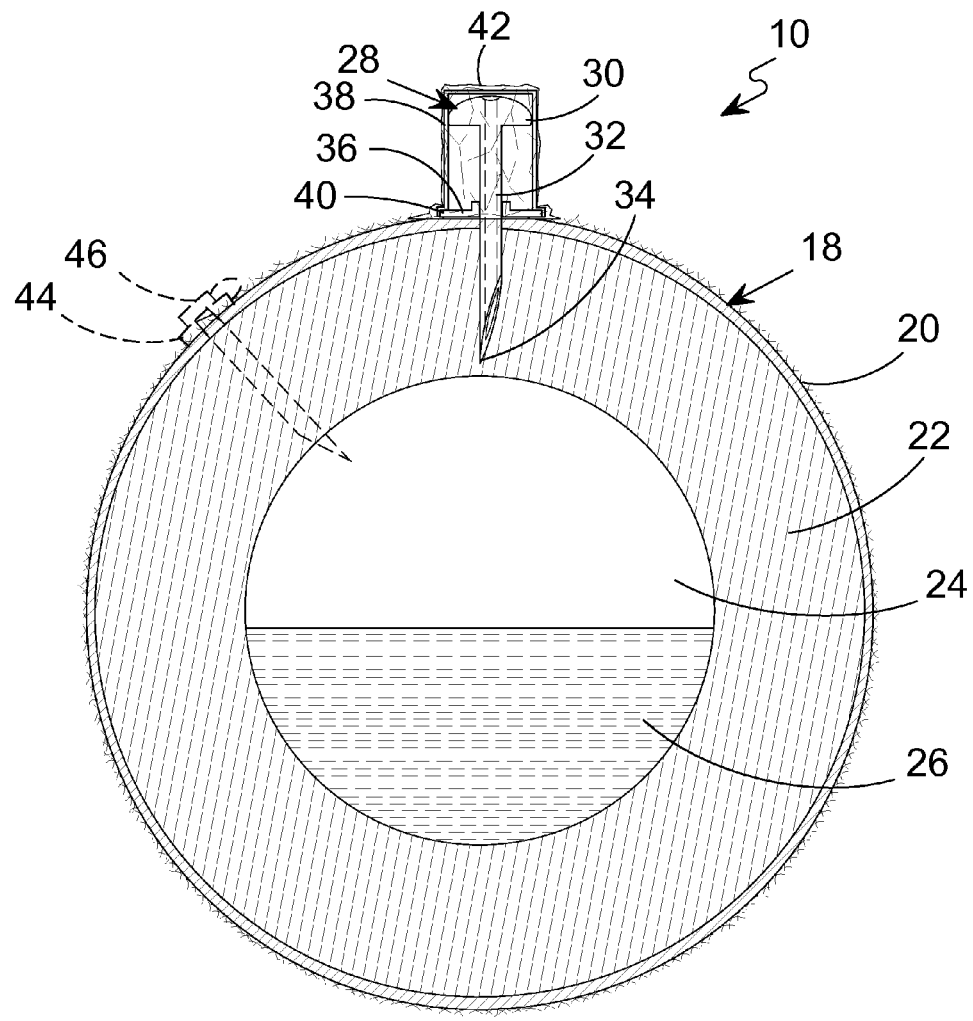
FIG. 3 is a sectional view of the coconut spigot partial inserted into a coconut.

FIG. 3 is a sectional view of the coconut spigot partial inserted into a coconut. The present invention 10 provides means for a consumer to easily extract coconut water 26 from coconut cavity 24 by partially inserting a spigot 28 comprising spout 30, conduit 32 having spike-tip 34 through grommet 36 and coconut seed 18 having coconut seed-case 20 and into the coconut meat 22 and then covering the spigot 28 with spigot cap 38 having flange 40 frictionally engaging grommet 36 and a protective member in cap seal 42. Alternately provided is air valve 44 having tethered bung 46 for bleeding air into the coconut cavity 24 as the coconut water 26 is removed.

Figure 4:
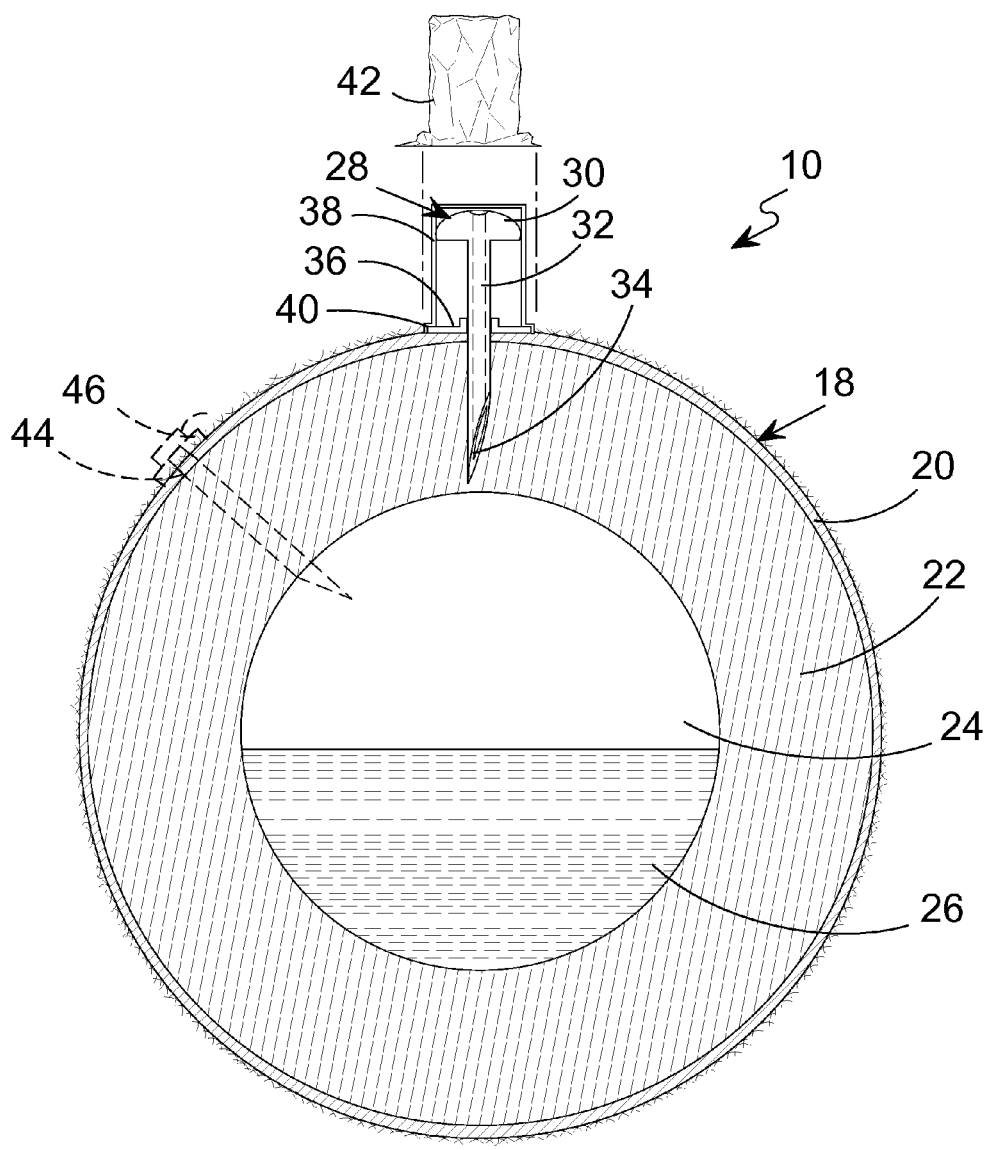
FIG. 4 is a sectional view of the coconut spigot partial inserted into a coconut.

FIG. 4 is a sectional view of the coconut spigot partial inserted into a coconut. Illustrated is the cap seal 42 removed from its seated position. Cap seal 42 serves as a tamper evident covering for the consumer and to prevent contamination of the spigot cap 38 prior to consumer access. The present invention 10 provides means for a consumer to easily extract coconut water 26 from coconut cavity 24 by partially inserting spigot 28 comprising spout 30, conduit 32 having spike-tip 34 through grommet 36 and coconut seed 18 having coconut seed-case 20 and into the coconut meat 22 and then covering the spigot 28 with spout cap 38 having flange 40 frictionally engaging grommet 36 and a protective member 42. Alternately provided is air valve 44 having tethered bung 46 for bleeding air into the coconut cavity 24 as the coconut water 26 is removed.

Figure 5:
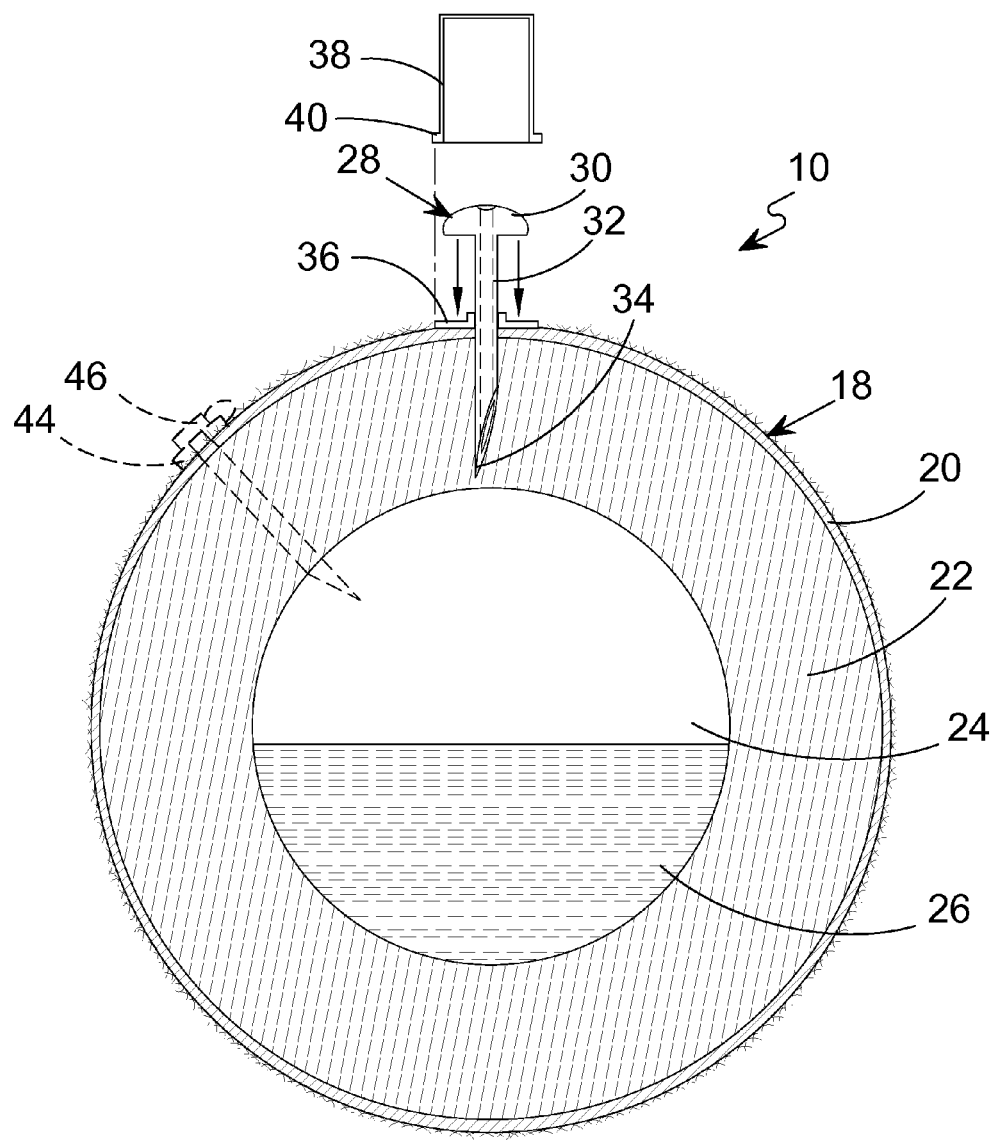
FIG. 5 is a sectional view of the coconut spigot partial inserted into a coconut with spigot cap removed.

FIG. 5 is a sectional view of the coconut spigot partial inserted into a coconut with spigot cap removed. With the cap seal removed the spigot cap 38 having flange 40 frictionally engaging grommet 36 is removed providing access to spigot 28, comprising spout 30, conduit 32 terminating in spike-tip 34 that has been positioned within coconut meat 22 of coconut seed 18 having coconut seed-case 20 wherethen the consumer can easily push spigot 28 through the remainder of coconut meat 22 into the coconut water cavity 24 thereby having access to the sterile coconut water 26. Alternately provided is air valve 44 having tethered bung 46 for bleeding air into the coconut cavity 24 as the coconut water 26 is removed.

Figure 6:
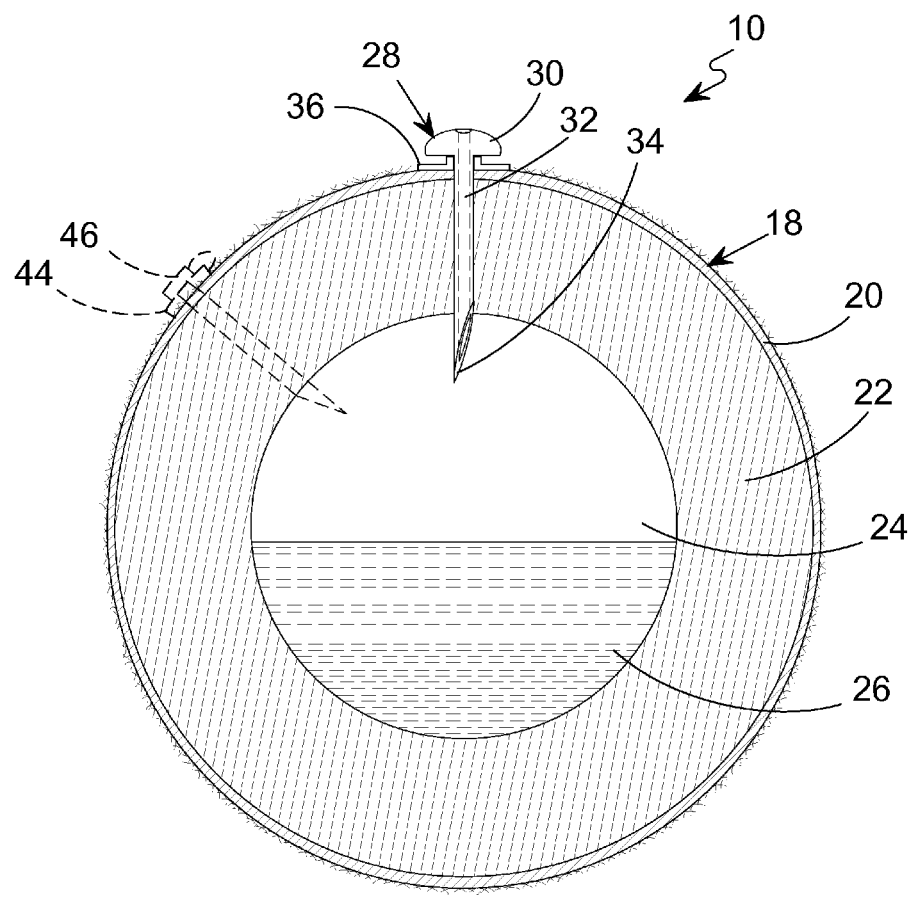
FIG. 6 is a sectional view of the coconut spigot inserted into the coconut water cavity.

FIG. 6 is a sectional view of the coconut spigot inserted into the coconut water cavity. Illustrated is spigot 28 comprising spout 30 and conduit 32 terminating in spike-tip 34 fully inserted through coconut meat 22 into the coconut cavity 24 of coconut seed 18 having coconut seed-case 20 thereby providing access to coconut water 26. Grommet 36 serves as attachment for the spigot cap and as a stop for completing the insertion of spigot 28 into coconut cavity 24.

Figure 7:
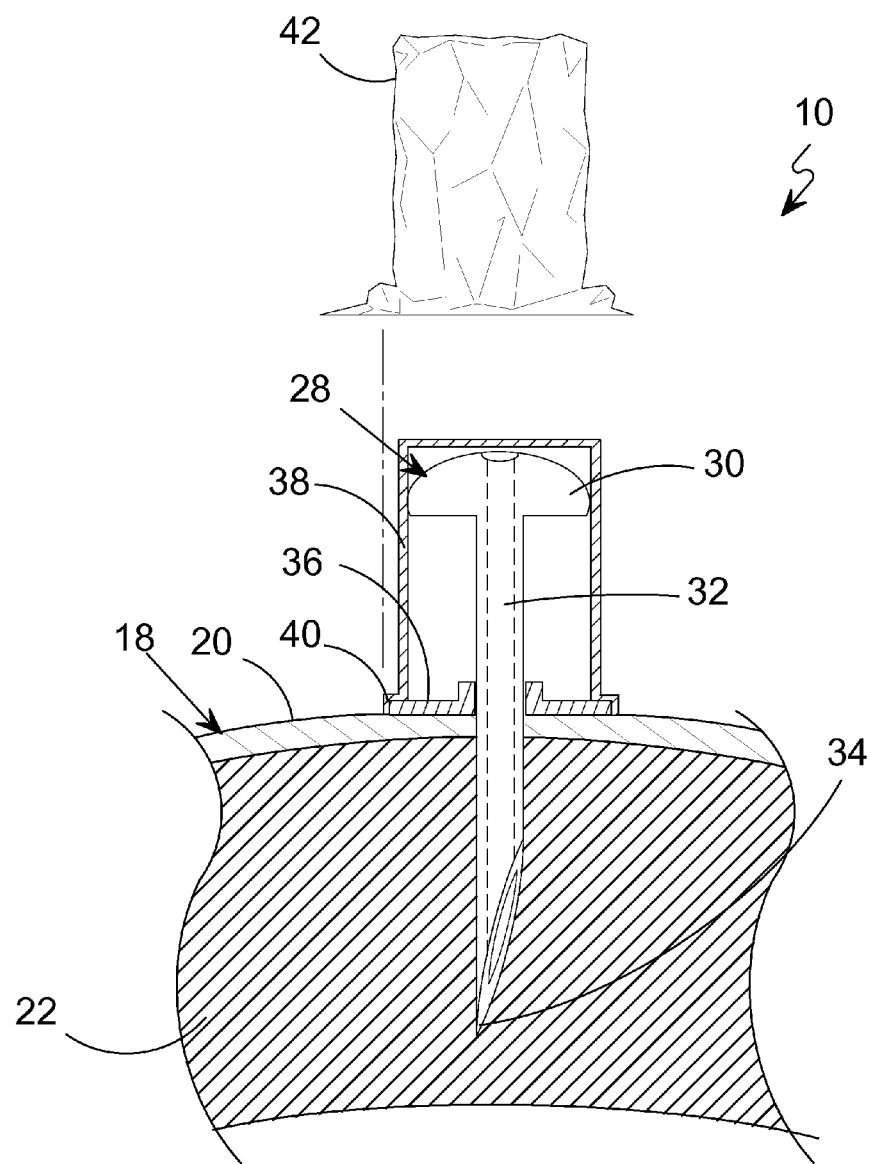
FIG. 7 is a sectional view of the coconut spigot partially inserted into the coconut.

FIG. 7 is a sectional view of the coconut spigot partially inserted into the coconut. Illustrated is the cap seal 42 removed from its seated position. Cap seal 42 serves as a tamper evident covering for the consumer and to prevent contamination of the spigot cap 38 prior to consumer access. The present invention 10 provides means for a consumer to easily extract coconut water via partially inserting spigot 28 comprising spout 30, conduit 32 having spike-tip 34 through grommet 36 and coconut seed 18 having coconut seed-case 20 and into the coconut meat 22 and then covering the spigot 28 with spout cap 38 having flange 40 frictionally engaging grommet 36 and a protective member 42.

Figure 8:
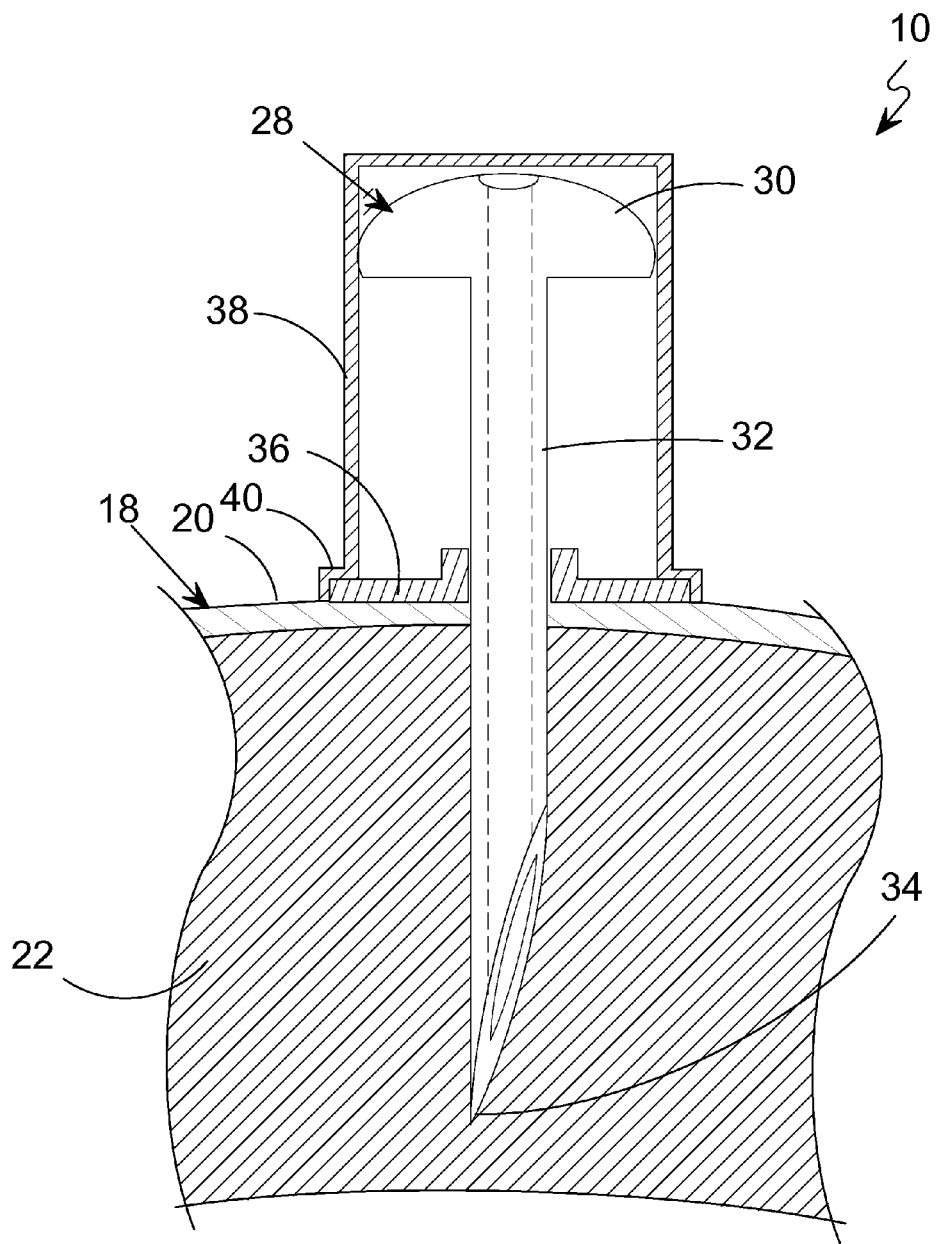
FIG. 8 is a sectional view of the coconut spigot partial inserted into a coconut.

FIG. 8 is a sectional view of the coconut spigot partial inserted into a coconut. Shown is the cap seal removed from spigot cap 38 with flange 40 frictionally engaging grommet 36 preventing casual displacement of spigot 28 during shipping and handling. Spigot 28 is comprised of spout 30 and conduit 32 terminating in spike-tip 34. Spigot 28 is inserted trough grommet 36 into coconut seed 18 having coconut seed-case 20 until spike-tip 34 is imbedded in coconut meat 22 without compromising the coconut cavity having the coconut water therein.

Figure 9:
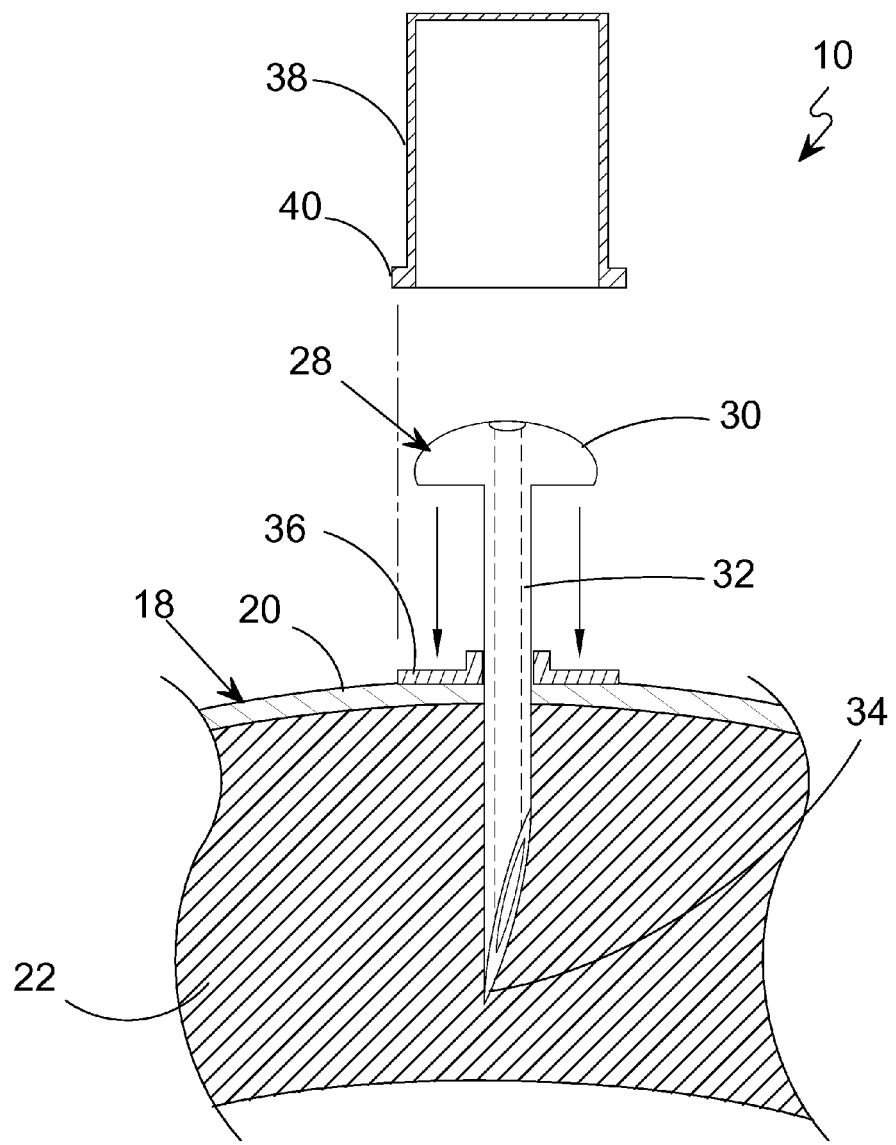
FIG. 9 is a sectional view of the coconut spigot partially inserted into the coconut.

FIG. 9 is a sectional view of the coconut spigot partially inserted into the coconut. Illustrated is the cap seal and spigot cap 38 having flange 40 removed from its frictional engagement with grommet 36 thereby providing access to spigot 28, comprising spout 30, conduit 32 terminating in spike-tip 34 that has been positioned within coconut meat 22 of coconut seed 18 having coconut seed-case 20 wherethen the consumer can easily push spigot 28 through the remainder of coconut meat 22 into the coconut water cavity to access the sterile coconut water.

Figure 10:
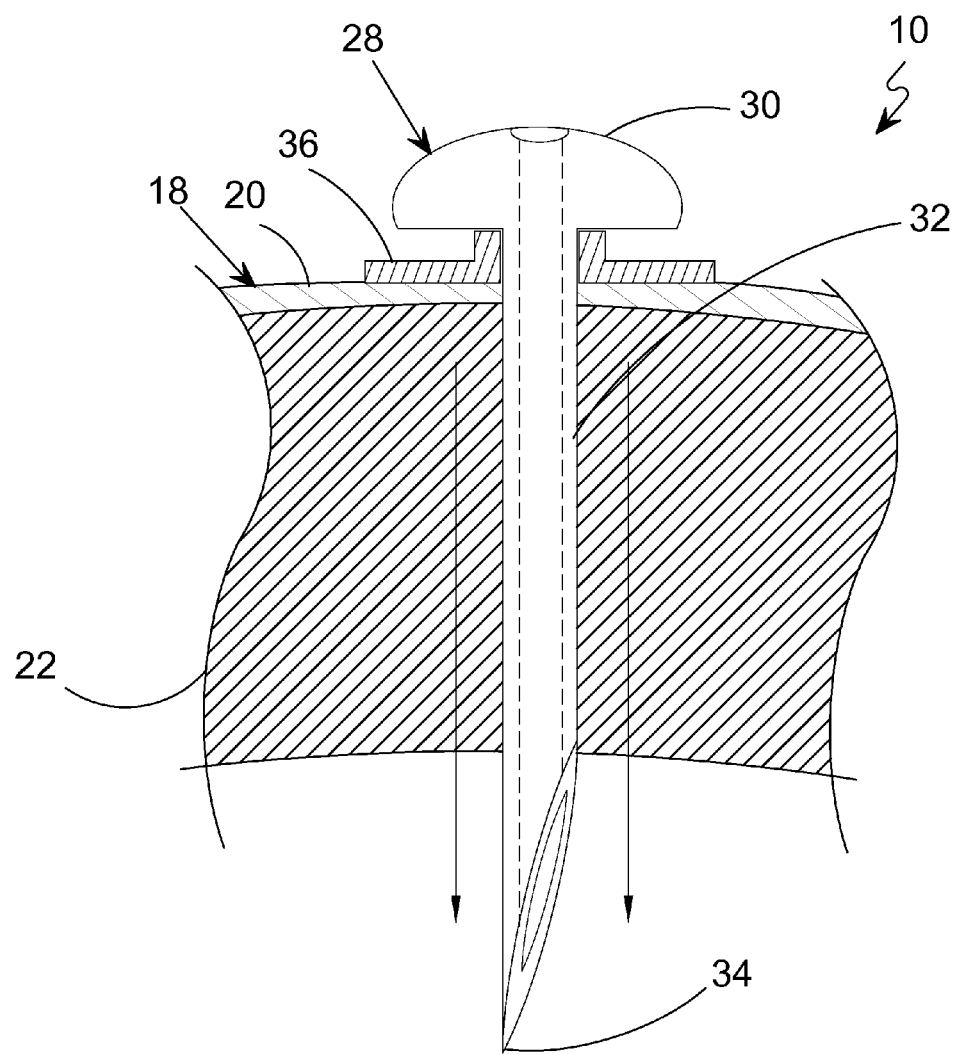
FIG. 10 is a sectional view of the coconut spigot fully inserted into the coconut cavity.

FIG. 10 is a sectional view of the coconut spigot fully inserted into the coconut cavity. Illustrated is spigot 28 comprising spout 30 and conduit 32 terminating in spike-tip 34 fully inserted through coconut meat 22 into the coconut cavity of coconut seed 18 having coconut seed-case 20 thereby providing access to coconut water. Grommet 36 serves as attachment for the spigot cap and as a stop for completing the insertion of spigot 28 by the consumer into the coconut cavity.

Figure 11:
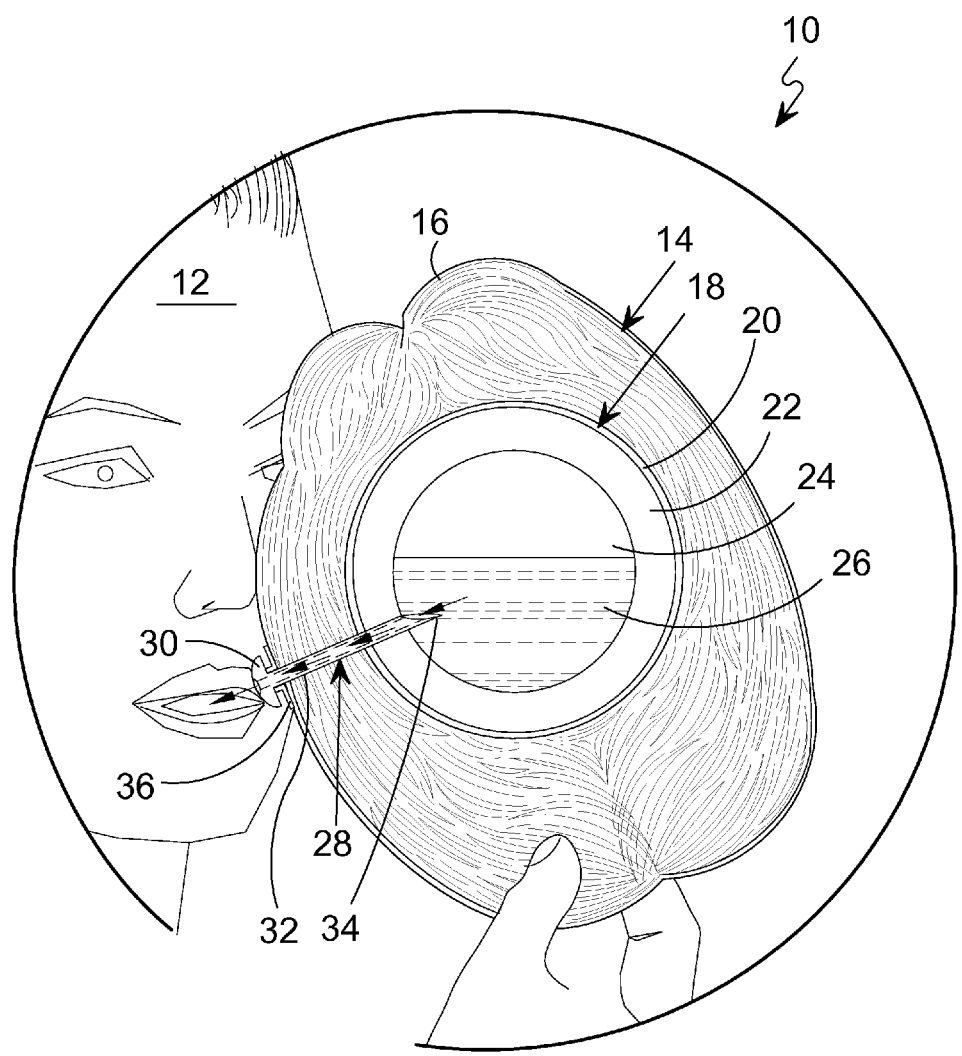
FIG. 11 is an illustrative view of the present invention in use.

FIG. 11 is an illustrative view of the present invention in use. The present invention 10 provides a spigot 28 that is partially imbedded into a coconut 14 having coconut husk 16 so that a consumer 12 can gain access to the coconut water 26 by completing the insertion of the spigot 28 through the coconut meat 22 into coconut cavity 24. Coconut 14 has coconut husk 16 encasing coconut seed 18 having seed-case 20. The present invention provides for the present invention with husk 16 or without husk 16 as previously illustrated. Grommet 32 is placed on coconut husk 16 and spigot 28 is inserted through husk 16 and coconut seed 18 having seed-case 20 into coconut meat 22 so that consumer 12 can easily complete the spigot insertion into coconut cavity 24 to access coconut water 26.

Figure 12:
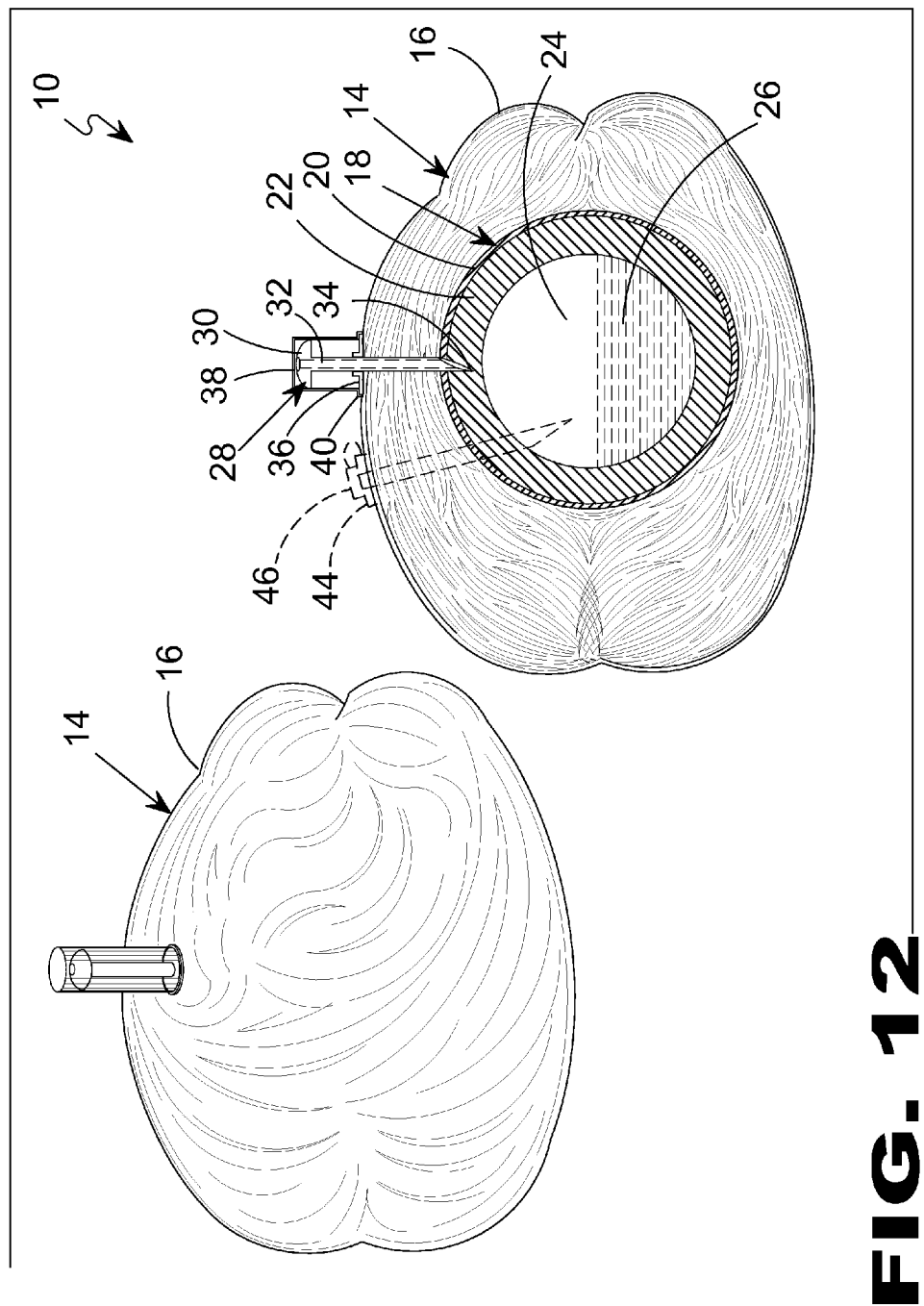
FIG. 12 is an illustrative view of the present invention in use.

FIG. 12 is an illustrative view of the present invention in use. The present invention 10 provides means for a consumer to easily extract the coconut water 26 of coconut 14 from coconut cavity 24 by partially inserting a spigot 28 comprising spout 30, conduit 32 having spike-tip 34 through grommet 36, coconut husk 16, coconut seed 18 having coconut seed-case 20 and into the coconut meat 22 and then covering spigot 28 with spigot cap 38 having flange 40 frictionally engaging grommet 36 and a cap seal. Alternately provided is air valve 44 having tethered bung 46 for bleeding air into the coconut cavity 24 as the coconut water 26 is removed.

Figure 13:
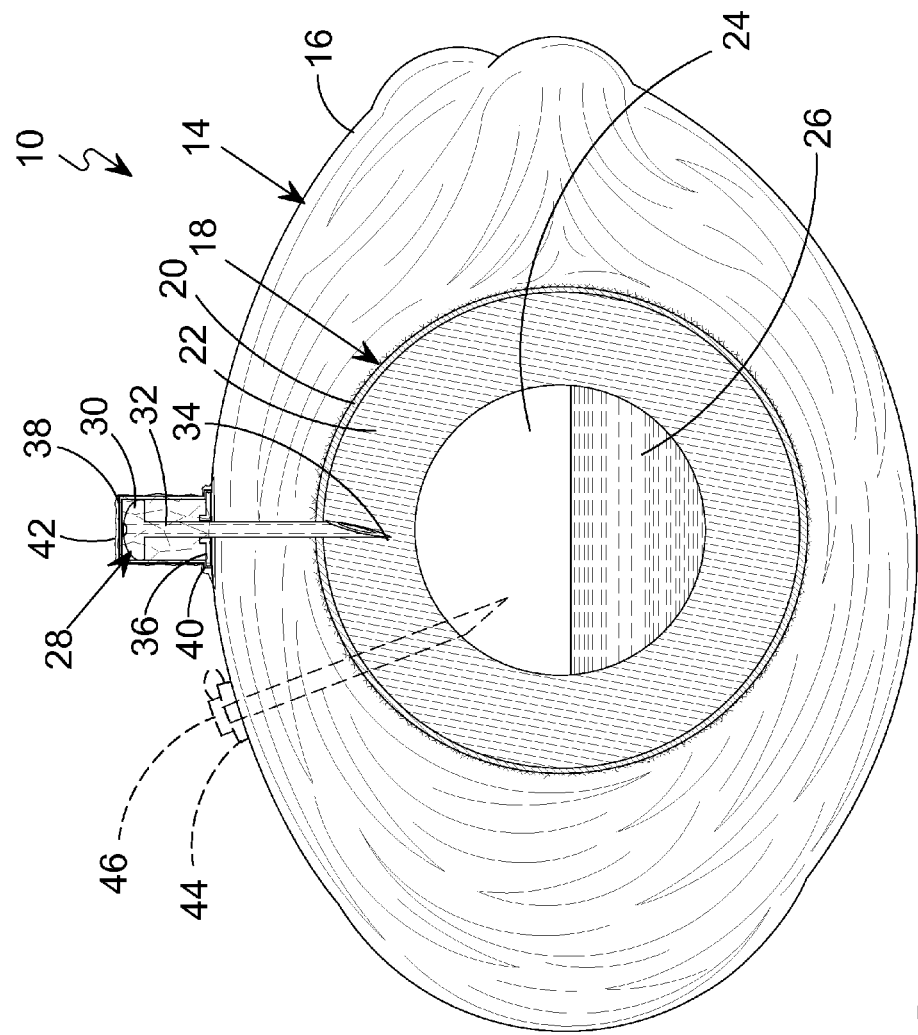
FIG. 13 is a sectional view of the coconut spigot partial inserted into a coconut.

FIG. 13 is a sectional view of the coconut spigot partial inserted into a coconut. The present invention 10 provides means for a consumer to easily extract coconut water 26 from coconut 14 having husk 16 by partially inserting a spigot 28 comprising spout 30, conduit 32 having spike-tip 34 through grommet 36, coconut husk 16 and coconut seed 18 having coconut seed-case 20 and into the coconut meat 22 and then covering the spigot 28 with spigot cap 38 having flange 40 frictionally engaging grommet 36 and a protective member in cap seal 42. Alternately provided is air valve 44 having tethered bung 46 for bleeding air into the coconut cavity 24 as the coconut water 26 is removed.

Figure 14:
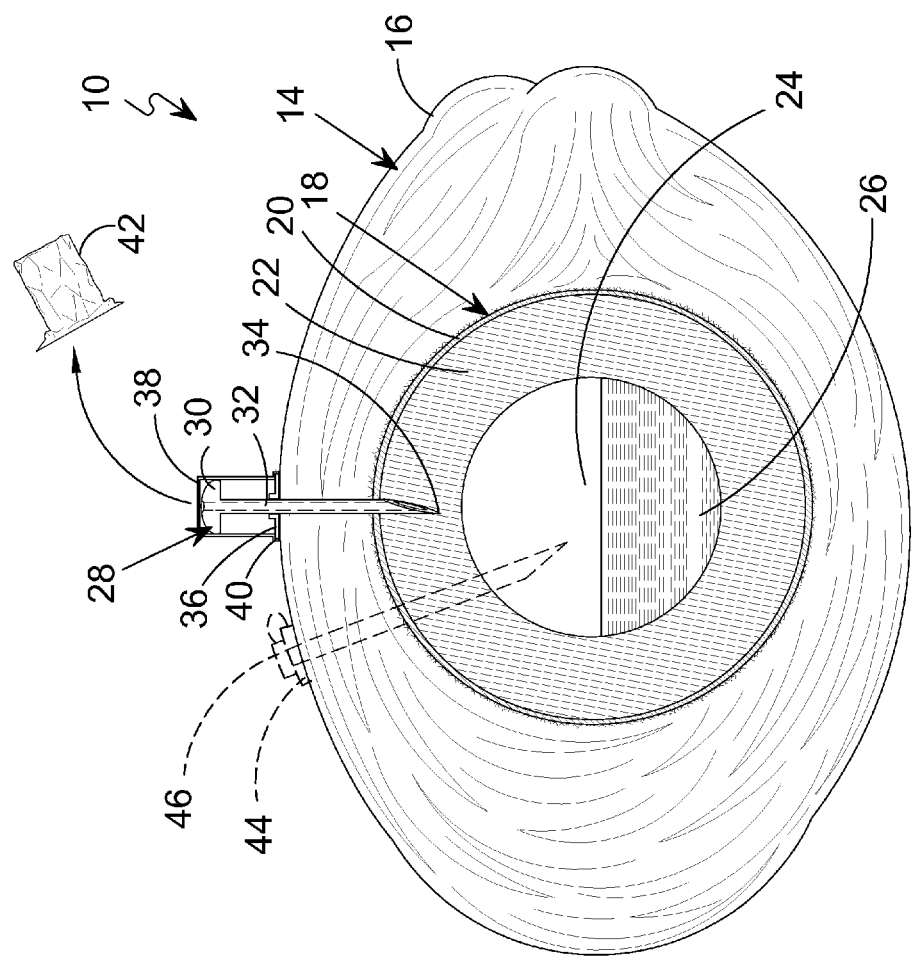
FIG. 14 is a sectional view of the coconut spigot partial inserted into a coconut.

FIG. 14 is a sectional view of the coconut spigot partial inserted into a coconut. Illustrated is the cap seal 42 removed from its seated position. Cap seal 42 serves as a tamper evident covering for the consumer and to prevent contamination of the spigot cap 38 prior to consumer access. The present invention 10 provides means for a consumer to easily extract coconut water 26 from coconut cavity 24 by partially inserting spigot 28 comprising spout 30, conduit 32 having spike-tip 34 through grommet 36 into coconut 14 having coconut husk 16 and coconut seed 18 having coconut seed-case 20 and into the coconut meat 22 and then covering the spigot 28 with spout cap 38 having flange 40 frictionally engaging grommet 36 and a protective member 42. Alternately provided is air valve 44 having tethered bung 46 for bleeding air into the coconut cavity 24 as the coconut water 26 is removed.

Figure 15:
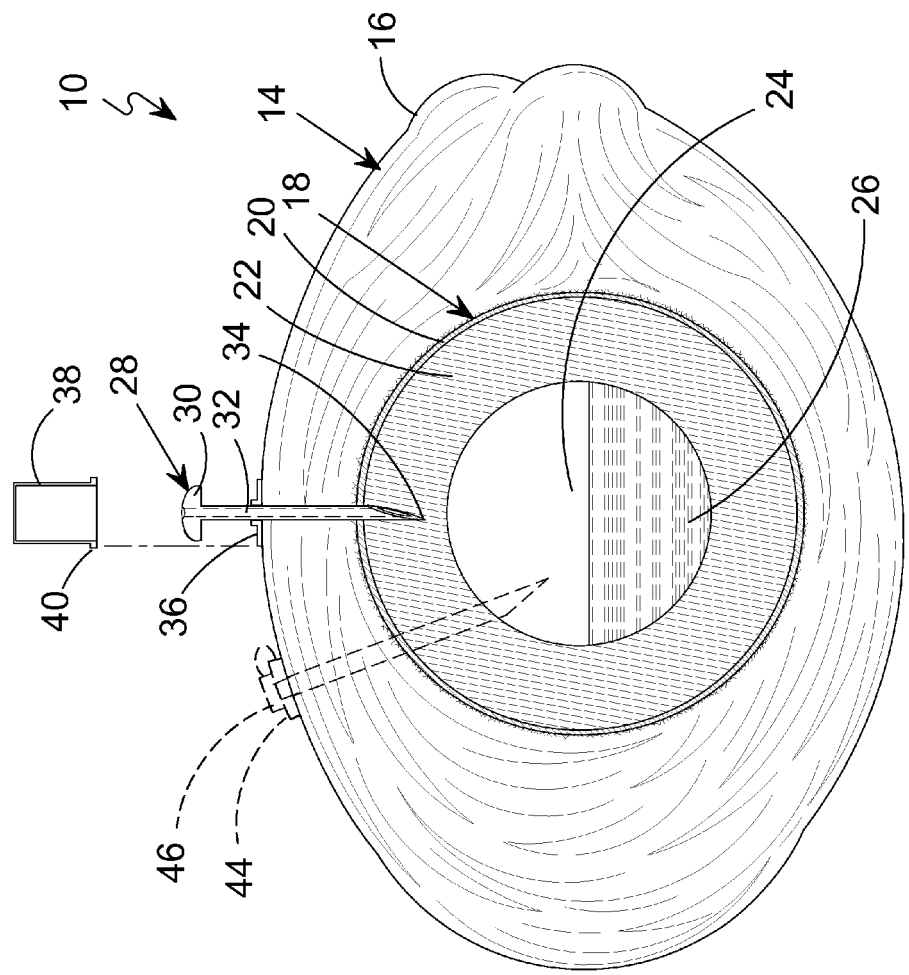
FIG. 15 is a sectional view of the coconut spigot partial inserted into a coconut with cap removed.

FIG. 15 is a sectional view of the coconut spigot partial inserted into a coconut with cap removed. With the cap seal removed the spigot cap 38 having flange 40 frictionally engaging grommet 36 is removed providing access to spigot 28, comprising spout 30, conduit 32 terminating in spike-tip 34 that has been positioned within coconut meat 22 of coconut 14 having husk 16 and coconut seed 18 having coconut seed-case 20 wherethen the consumer can easily push spigot 28 through the remainder of coconut meat 22 into the coconut water cavity 24 thereby having access to the sterile coconut water 26. Alternately provided is air valve 44 having tethered bung 46 for bleeding air into the coconut cavity 24 as the coconut water 26 is removed.

Figure 16:
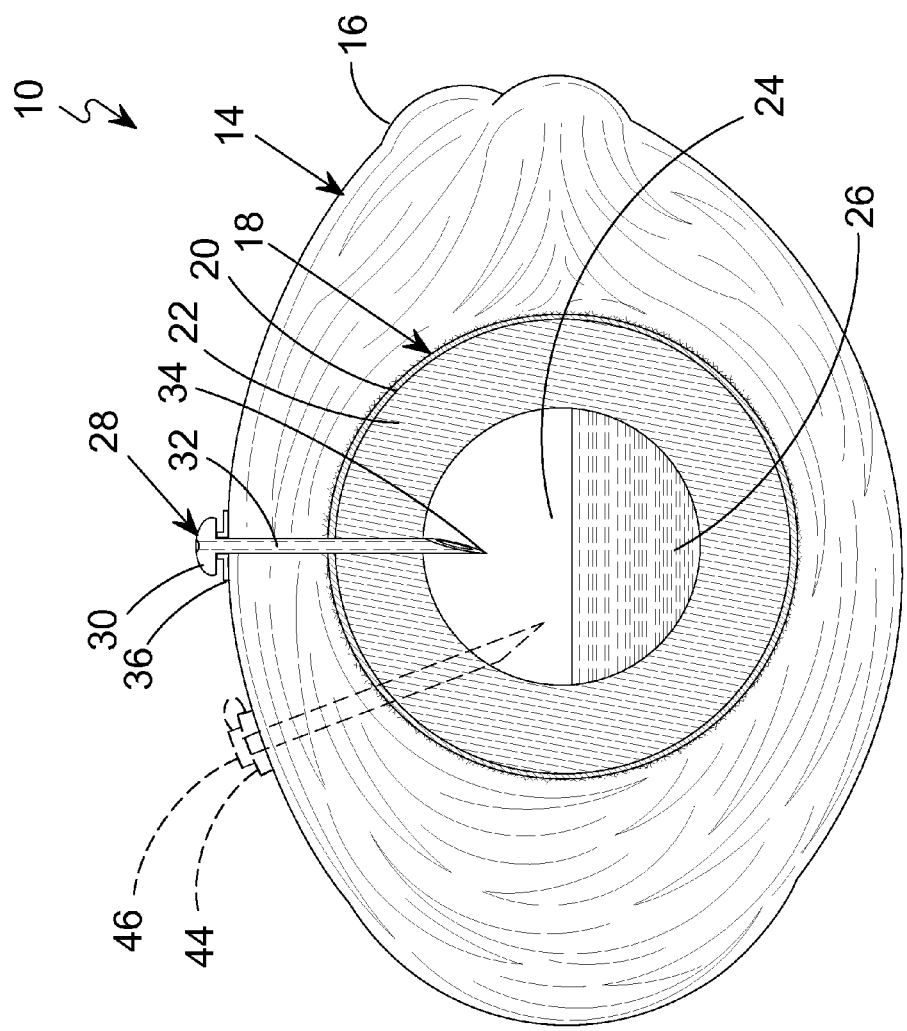
FIG. 16 is a sectional view of the coconut spigot inserted into the coconut water cavity.

FIG. 16 is a sectional view of the coconut spigot inserted into the coconut water cavity. Illustrated is spigot 28 comprising spout 30 and conduit 32 terminating in spike-tip 34 fully inserted through coconut meat 22 into the coconut cavity 24 of coconut 14 having husk 16 encompassing coconut seed 18 having coconut seed-case 20 thereby providing access to coconut water 26. Grommet 36 serves as attachment for the spigot cap and as a stop for completing the insertion of spigot 28 into coconut cavity 24.

Figure 17:
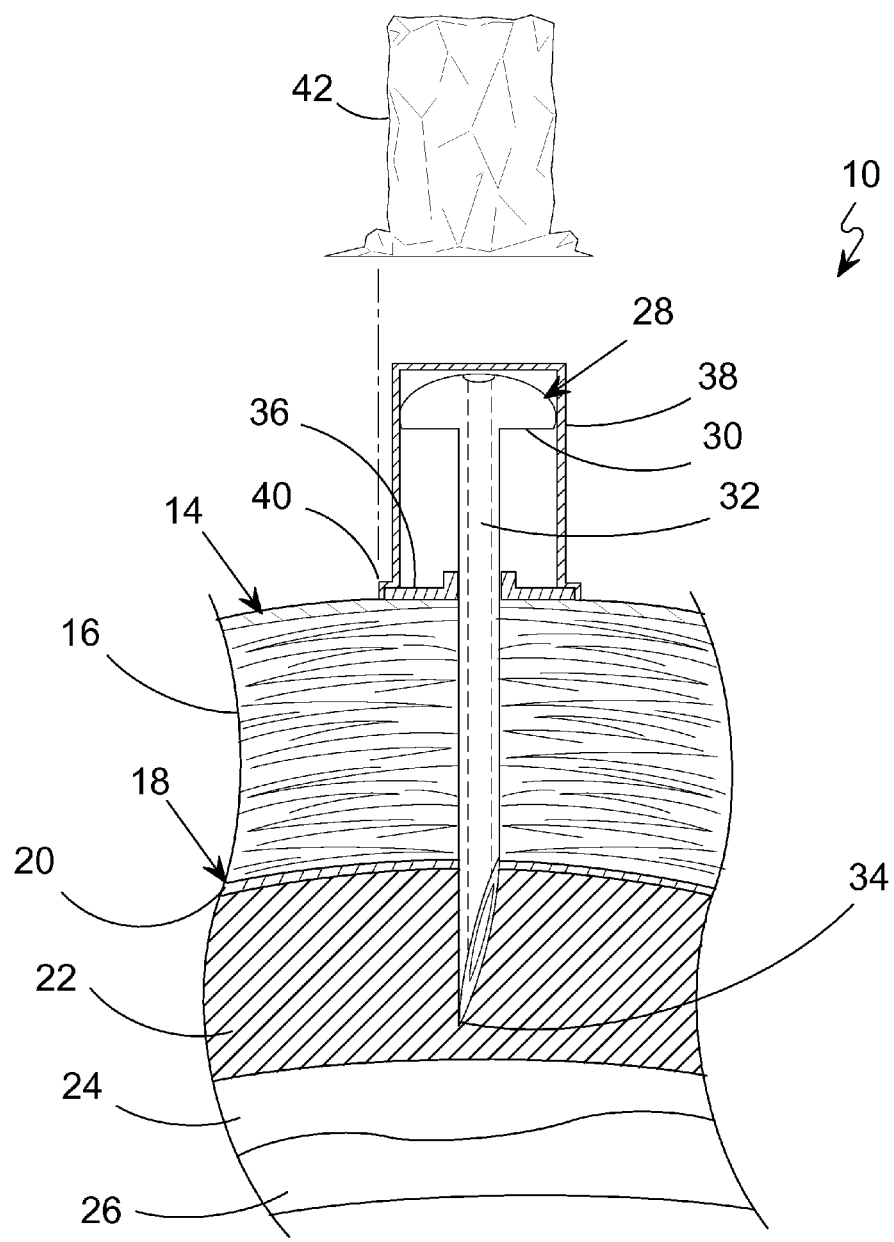
FIG. 17 is a sectional view of the coconut spigot partially inserted into the coconut.

FIG. 17 is a sectional view of the coconut spigot partially inserted into the coconut. Illustrated is the cap seal 42 removed from its seated position. Cap seal 42 serves as a tamper evident covering for the consumer and to prevent contamination of the spigot cap 38 prior to consumer access. The present invention 10 provides means for a consumer to easily extract coconut water via partially inserting spigot 28 comprising spout 30, conduit 32 having spike-tip 34 positioned through grommet 36 situated on coconut 14 husk 16 encompassing coconut seed 18 having coconut seed-case 20 and into the coconut meat 22 and then covering the spigot 28 with spout cap 38 having flange 40 frictionally engaging grommet 36 and covered by cap seal 42.

Figure 18:
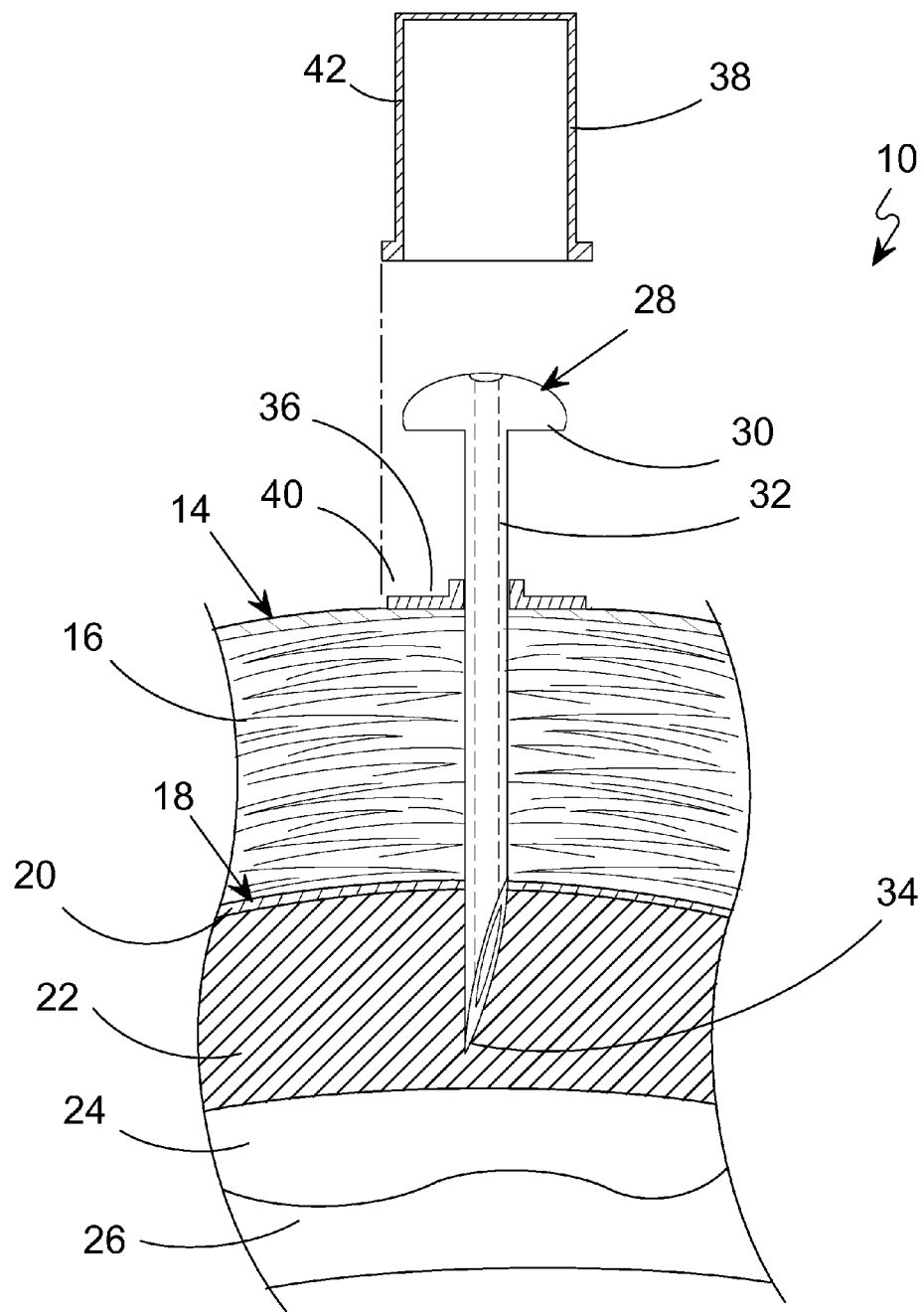
FIG. 18 is a sectional view of the coconut spigot partially inserted into the coconut.

FIG. 18 is a sectional view of the coconut spigot partially inserted into the coconut. Illustrated is the cap seal and spigot cap 38 having flange 40 removed from its frictional engagement with grommet 36 thereby providing access to spigot 28, comprising spout 30, conduit 32 terminating in spike-tip 34 that has been positioned within coconut meat 22 of coconut 14 having husk 16 encompassing coconut seed 18 having coconut seed-case 20 wherethen the consumer can easily push spigot 28 through the remainder of coconut meat 22 into the coconut water cavity to access the sterile coconut water.

Figure 19:
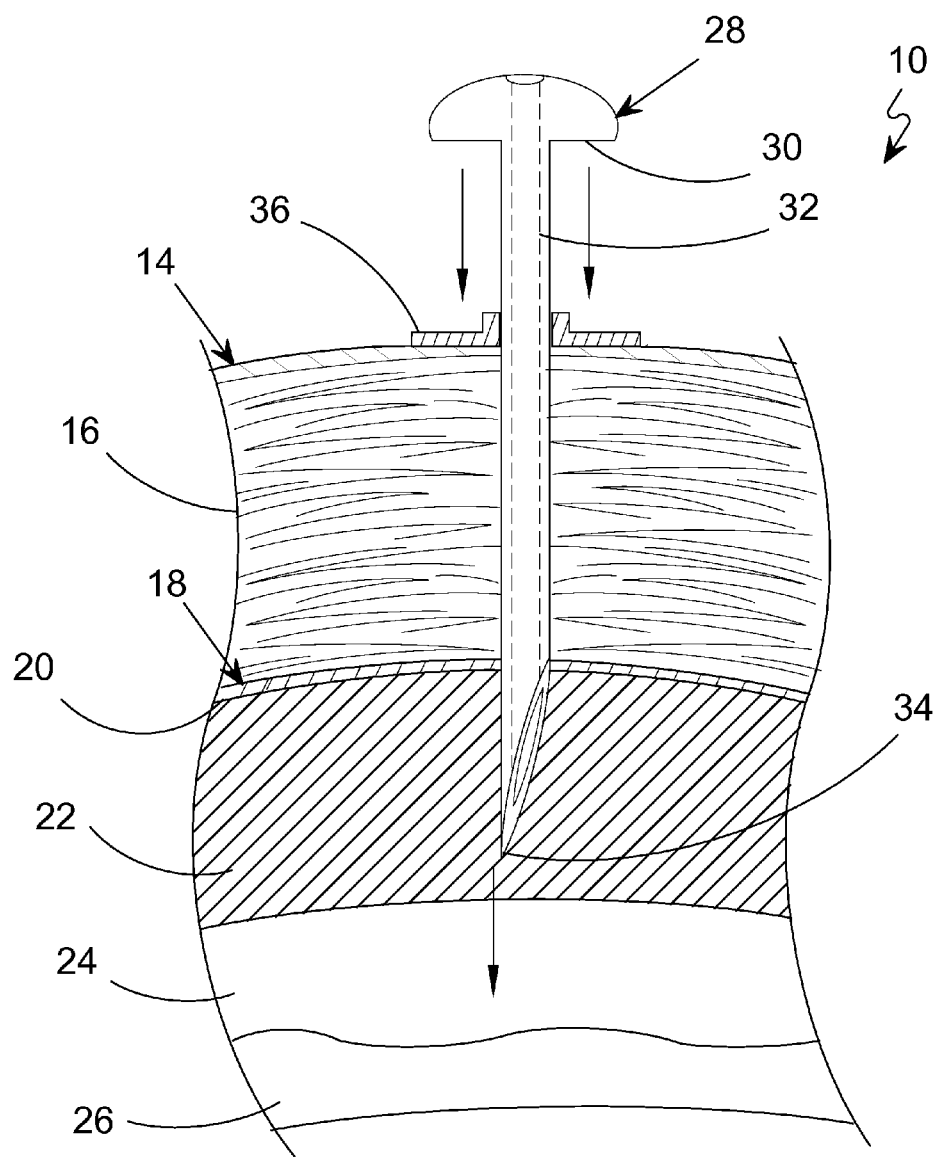
FIG. 19 is a sectional view of the coconut spigot partially inserted into the coconut.

FIG. 19 is a sectional view of the coconut spigot partially inserted into the coconut. Illustrated is the cap seal and spigot cap 38 having flange 40 removed from its frictional engagement with grommet 36 thereby providing access to spigot 28, comprising spout 30, conduit 32 terminating in spike-tip 34 that has been positioned within coconut meat 22 of coconut 14 having husk 16 encompassing seed 18 having coconut seed-case 20 wherethen the consumer can easily push spigot 28 through the remainder of coconut meat 22 into the coconut water cavity to access the sterile coconut water.

Figure 20:
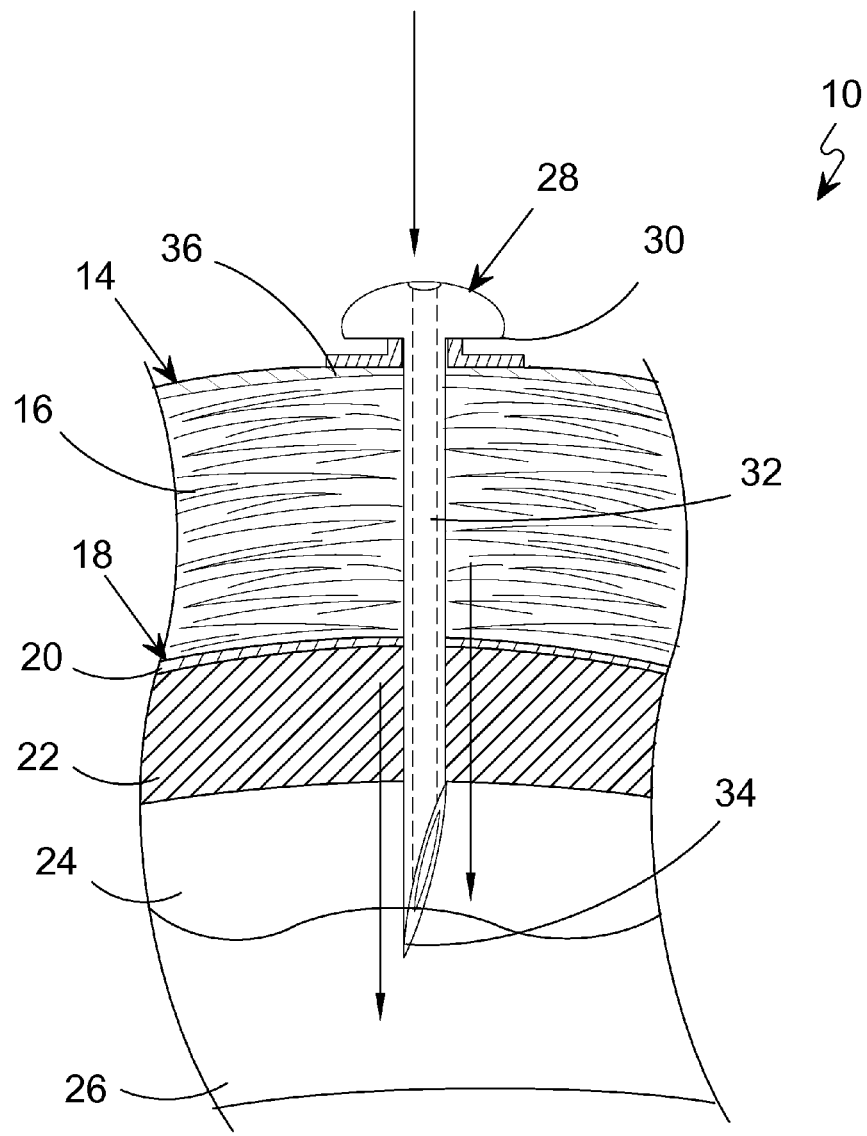
FIG. 20 is a sectional view of the coconut spigot fully inserted into the coconut cavity.

FIG. 20 is a sectional view of the coconut spigot fully inserted into the coconut cavity. Illustrated is spigot 28 comprising spout 30 and conduit 32 terminating in spike-tip 34 fully inserted through coconut meat 22 into the coconut cavity of coconut 14 having coconut husk 16 encompassing coconut seed 18 having coconut seed-case 20 thereby providing access to coconut water. Grommet 36 serves as attachment for the spigot cap and as a stop for completing the insertion of spigot 28 into the coconut cavity.

Figure 21:
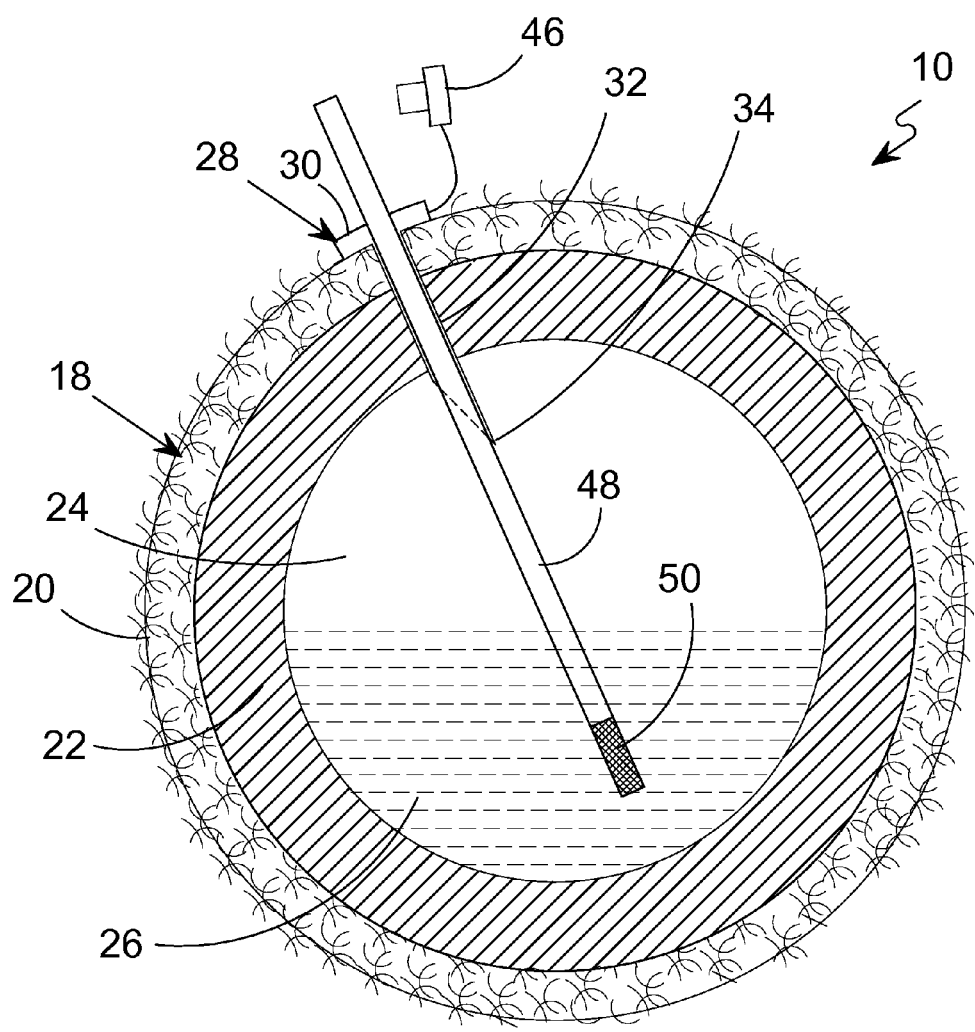
FIG. 21 is a sectional view of the coconut spigot inserted into the coconut water cavity.

FIG. 21 is a sectional view of an additional element comprising closable grommet and straw. The present invention 10 alternately provides for spigot 28 having spout 30 with closable bung 46, conduit 32 terminating in spike-tip 34 placed through grommet 36 and coconut seed 18 having coconut seed-case 20 through coconut meat 22 and into coconut cavity 24 wherethen the consumer can extract the coconut water through straw 48 having filter 50 to prevent pulp from being drawn into the straw.

Figure 22:
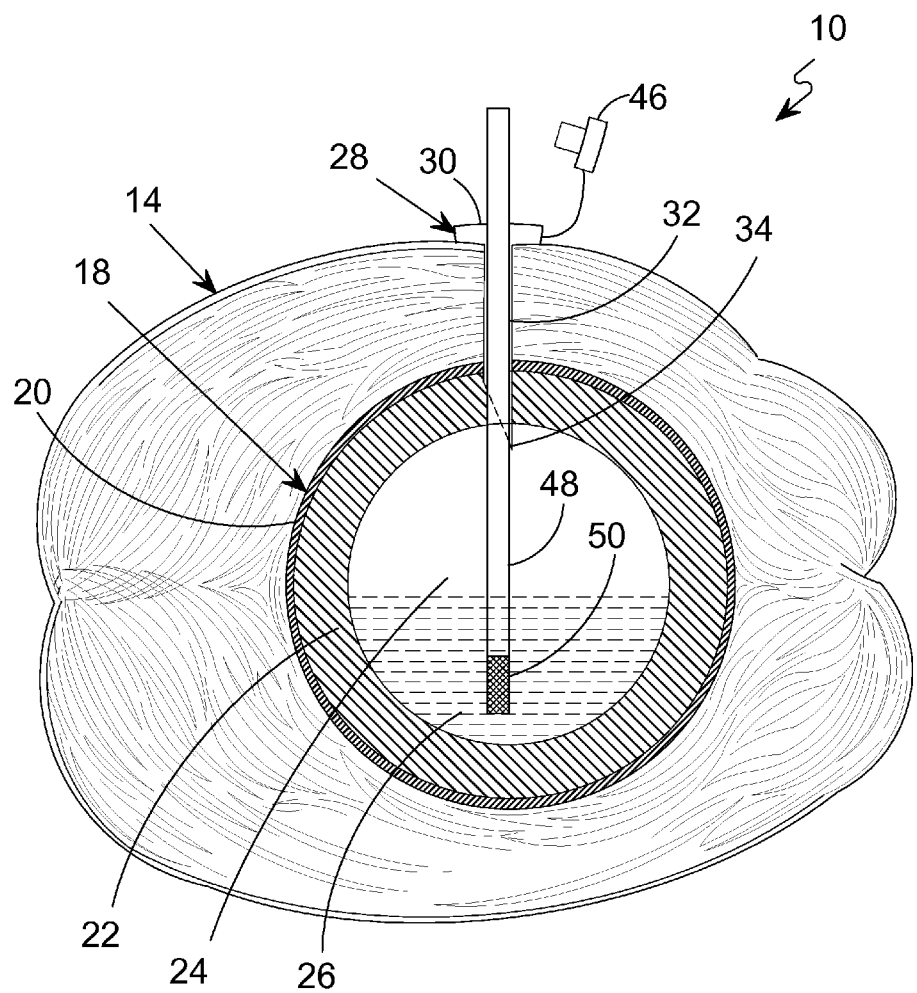
FIG. 22 is a sectional view of the coconut spigot inserted into the coconut water cavity.

FIG. 22 is a sectional view of an additional element comprising closable grommet and straw. The present invention 10 also provides for spigot 28 having spout 30 with closable bung 46, conduit 32 terminating in spike-tip 34 placed through grommet 36 positioned on coconut 14 having husk 16 encompassing coconut seed 18 having coconut seed-case 20 through coconut meat 22 and into coconut cavity 24 wherethen the consumer can extract the coconut water through straw 48 having filter 50 to prevent pulp from being drawn into the straw.

Figure 23:
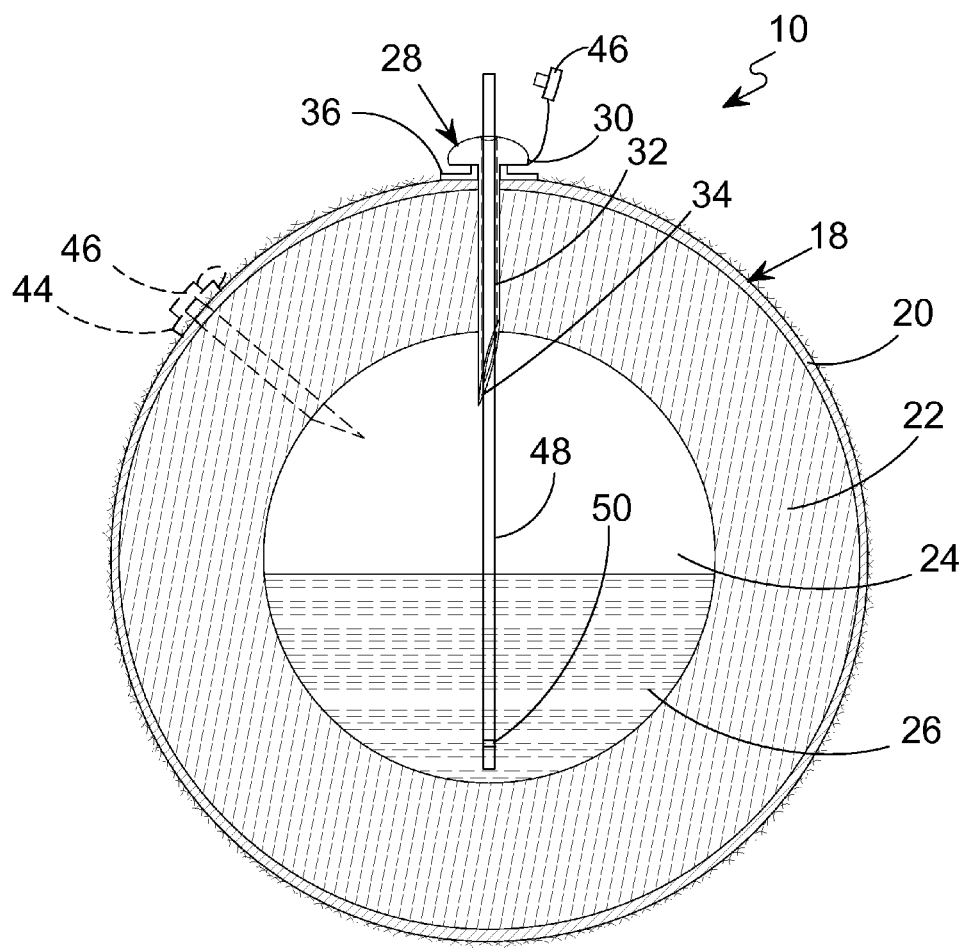
FIG. 23 is a sectional view of a coconut having a straw with slits and a closed end.

FIG. 23 is a sectional view of the coconut spigot inserted into the coconut water cavity. Illustrated is spigot 28 comprising spout 30 and conduit 32 terminating in spike-tip 34 fully inserted through coconut meat 22 into the coconut cavity 24 of coconut seed 18 having coconut seed-case 20 thereby providing access to coconut water 26 via straw 48 having filter 50. Grommet 36 serves as attachment for the spigot cap and as a stop for completing the insertion of spigot 28 into coconut cavity 24 with bung 46 serving as closure to keep any unconsumed coconut fresh.

Figure 24:
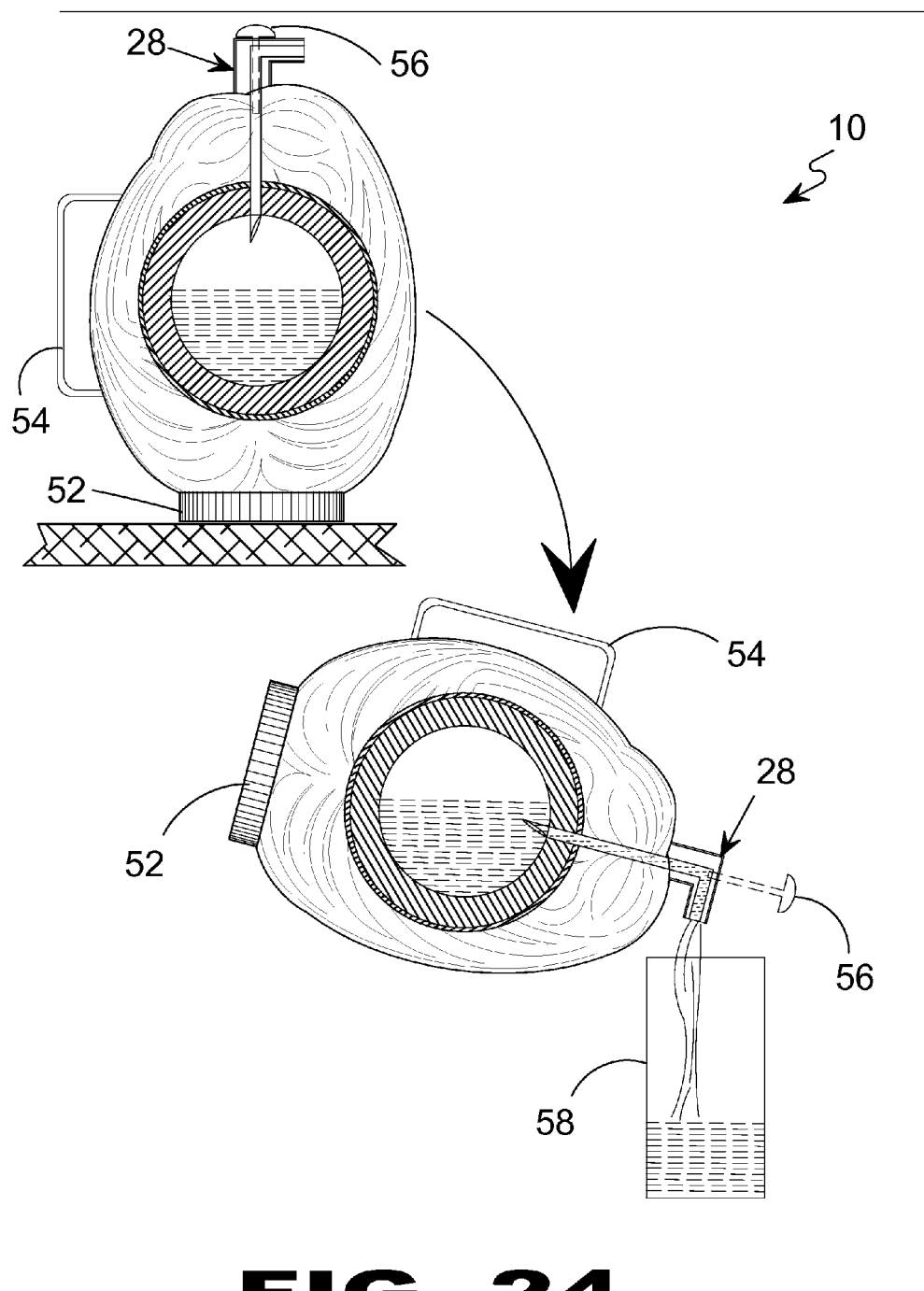
FIG. 24 is an illustrative view of a stand and handle for a coconut.

FIG. 24 is an illustrative view of additional elements of the present invention. The present invention 10 further provides for a coconut stand 52 and coconut handle 54 as a convenience for accessing the coconut water. Further provided is spigot 28 having a plunger 56 that seals spigot 28 to keep the coconut water fresh until the plunger is selectively removed from the spigot conduit wherethen the consumer can dispenses the coconut water into glass 58.

What is claimed is new and desired to be protected by Letters Patent is set forth in the appended claim:

1. A method for accessing and removing sterile water within a coconut, the coconut having a cavity containing the sterile water surrounded by coconut meat, the method comprising:
    inserting a spigot into the coconut such that an open end of the spigot is embedded into the meat, the spigot comprised of:
        a spout for dispensing the sterile water;
        a conduit in fluid communication with said spout;
        a spike-tip on the open end for easily inserting the spigot through the remainder of the coconut meat into the coconut cavity; and
        a grommet that stops insertion of the spigot into the coconut at a predetermined point;
    providing the spigot with a spigot cover that stops inadvertent insertion of the spigot into the coconut during shipping and storage, the cover comprising a cap flange that engages a periphery of the grommet; and
    providing the spigot cover with a cover-sealing means for preventing tampering and contamination of the spigot cover prior to access.

* * * * *